United States Patent [19]
Du Bois et al.

[11] 3,935,350
[45] Jan. 27, 1976

[54] SUPPRESSION OF CREVICE CORROSION IN GASKETED TITANIUM CREVICES BY THE USE OF RUBBER COMPOUND GASKETS SUBSTANTIALLY FREE OF CALCIUM

[75] Inventors: Donald W. Du Bois; William B. Darlington, both of Corpus Christi, Tex.

[73] Assignee: PPG Industries, Inc., Pittsburgh, Pa.

[22] Filed: June 27, 1974

[21] Appl. No.: 483,725

Related U.S. Application Data

[62] Division of Ser. No. 348,452, April 5, 1973, Pat. No. 3,857,773.

[52] U.S. Cl. ............... 428/35; 428/462; 260/42.37; 260/42.33
[51] Int. Cl.² ........................................... C25B 1/24
[58] Field of Search................ 260/42.3; 75/175.5; 161/221; 428/35, 462

[56] References Cited
UNITED STATES PATENTS

| | | | |
|---|---|---|---|
| 3,362,931 | 1/1968 | Kraus et al. | 260/42.37 |
| 3,374,198 | 3/1968 | Falcone et al. | 260/42.37 |
| 3,398,111 | 8/1968 | Willis | 260/42.37 |
| 3,469,975 | 9/1969 | Bertea | 75/175.5 |
| 3,664,403 | 5/1972 | Doran et al. | 260/42.37 |
| 3,686,868 | 8/1972 | Chase et al. | 260/42.37 |
| 3,836,410 | 3/1972 | Du Bois | 156/3 |

*Primary Examiner*—George F. Lesmes
*Assistant Examiner*—William R. Dixon, Jr.
*Attorney, Agent, or Firm*—Richard M. Goldman

[57] ABSTRACT

Disclosed herein is a method of reducing crevice corrosion in titanium structures having gasketed joints, by the use of rubber gaskets characterized by the substantial absence of calcium. Also disclosed is a method of electrolysis in a titanium vessel having gasketed titanium joints with rubber gaskets substantially free of calcium in the joints and crevices.

3 Claims, No Drawings

SUPPRESSION OF CREVICE CORROSION IN GASKETED TITANIUM CREVICES BY THE USE OF RUBBER COMPOUND GASKETS SUBSTANTIALLY FREE OF CALCIUM

This is a division of application Ser. No. 348,452, filed Apr. 5, 1973, now U.S. Pat. No. 3,857,773.

BACKGROUND OF THE INVENTION

Numerous electrochemical reactions are conducted in titanium vessels. Among such industrially significant processes are the electrolysis of dilute brines, e.g., as in the desalinization of water and the decomposition of water, and the electrolysis of concentrated brines such as in the production of alkali metal halates, e.g., sodium chlorate, and the production of halogens, such as chlorine.

In the production of chlorine by the electrolysis of water in a diaphragm cell, a brine containing from about 300 to about 325 grams per liter of sodium chloride is introduced into the anolyte chamber of the diaphragm cell. Chlorine gas, $Cl_2$, is liberated at the anode within the anolyte chamber. The electrolyte, i.e., sodium chloride, then passes through the diaphragm to the catholyte chamber. Hydrogen gas, $H_2$, is liberated at the cathode and sodium hydroxide, NaOH is collected in the catholyte chamber.

The anolyte typically has a pH of from about 3.5 to about 5, and typically contains from about 250 grams per liter to about 300 grams per liter of sodium chloride. The catholyte typically has a pH of from about 12 to about 14 and contains from about 120 to about 180 grams per liter of sodium chloride, and from about 110 to about 160 grams per liter of sodium hydroxide.

In electrolytic cells, the cell body is fabricated of electrolyte-resistant materials. For example, the catholyte body is fabricated of iron, steel, nickel, chromium, or other suitable catholyteresistant metals. The anolyte chamber body may be fabricated of a valve metal. The valve metals are those metals which form a protective oxide coating on exposure to acidic media under anodic conditions, such as titanium, tantalum, vanadium, niobium, and the like. Usually, in diaphragm cells for the electrolysis of brines, the catholyte chamber is fabricated of iron or steel, and the anolyte chamber may be fabricated of titanium.

The anolyte chamber, fabricated of titanium, contains various crevices, such as at joints, edges, seals, and the like. Titanium, in these crevices, is particularly susceptible to a form of corrosion characterized as crevice corrosion. While the exact mechanism of this form of corrosion is not fully understood, it is generally found only in thin crevices, characterized by a high ratio of metal surface area to electrolyte volume within the crevice. It is generally believed that crevice corrosion is caused by the diffusion or seepage of electrolyte through gasketing into the crevice, establishing a local cell within the crevice. It has been found by previous workers that the electrolyte within the crevice is highly acidic, generally having a pH of less than 2, for example of 1.5 or even as low as 1.0. Within such crevices, the concentration of corrosion products is high. Concentrations on the order of more than 10 grams per liter and even higher, e.g., as high as 20 or even 30 grams per liter, have been reported. Additionally, any iron present in the titanium appears to serve as a site for the crevice corrosion of titanium.

The cathodic side of the local cell within the crevice generally contains a titanium hydride or subhydride e.g., $TiH_2$, phase which is brittle and readily flakes away to be hydrolyzed within the local cell. The anodic side generally contains incompletely formed suboxides of titanium which also flake away to form corrosion products which may be subsequently hydrolyzed.

The electrolyte within the local cell is further characterized in that it is oxygen deficient, and contains large amounts of halogen ion.

There have been various attempts to solve the problem of crevice corrosion; for example, various alloys of titanium with nickel such as the 2 percent nickel-titanium alloy disclosed in U.S. Pat. No. 3,469,975 to Bertea et al. Additionally, attempts have been made to reduce the surface iron content of the titanium such as disclosed in commonly assigned copending application Ser. No. 239,991 now U.S. Pat. No. 3,836,410 of Donald W. DuBois for "Method of Treating Titanium-Containing Structures." Other attempts at controlling crevice corrosion have included various coatings and have included the application of various surface films and coatings on the titanium and various treatments of the titanium surface.

SUMMARY OF THE INVENTION

It has now been found that substantial suppression of crevice corrosion in gasketed joints may be effected by the use of gaskets characterized by the substantial absence of calcium-containing fillers, pigments, and reinforcing agents therein.

Typical rubber gasket materials include ethylene-propylenediene, hereinafter called EPDM, neoprene, and isoprene.

It has been found that for applications as gaskets in titanium structures used for chlor-alkali electrolysis, the particular choice of fillers, pigments and reinforcing agents is particularly important, the preferred fillers, pigments and reinforcing agents being silicas and carbon.

DETAILED DESCRIPTION OF THE INVENTION

It has now been found that crevice corrosion in gasketed crevices of titanium structures may be substantially inhibited by the use of rubber gaskets where the gasket material is substantially free of calcium.

The rubber used in fabricating such gaskets is actually a rubber compound, compounded from the rubber polymer, sulfur, accelerator remnants, inhibitor remnants, anti-oxidants, anti-ozonants, peroxy cross-linking agents, and pigments, fillers, and reinforcing agents. The calcium is typically introduced into the rubber compound as part of the filler. A rubber compound that is substantially free of calcium is one containing less than 0.07 weight percent calcium by atomic absorption or less than 10 weight percent calcium in the ash by emission spectroscopy. Typical rubbers useful in this invention are those rubbers resistant to chloride brines, and substantially free of calcium, and include ethylene-propylene-diene, isoprene, and neoprene.

Ethylene-propylene-diene rubber contains a polymer having the repeating units

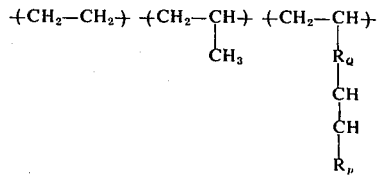

wherein in EPDM rubbers having the desired tensile strength, compressile strength, and resiliency, the ratio of the repeating units to each other, is well known in the art; $R_Q$ is a hydrocarbon moiety having the formula $(CH_2)_Q$ where Q is from 0 to about 3 and $R_P$ is a hydrocarbon moiety having the formula $(CH_2)_P(CH_3)$ where P is from 0 to about 3; the molecular weight of the polymer is from about 20,000 to about 1,000,000. EPDM rubber is further characterized by the presence of sulfur, the presence of accelerator remnants and the presence of anti-oxidants, anti-ozonants, peroxy cross-linking agents, and pigments, fillers and reinforcing agents, as will be more fully described hereinafter.

EPDM rubber contains from about 1 percent to about 3 percent by weight sulfur, accelerator remnants such as diazyl remnants and thiuran disulfide remnants, anti-oxidants, anti-ozonants, peroxy cross-linking agents, and pigments and reinforcing agents.

Typically, EPDM includes a filler, pigment or reinforcing agent. Whenever either the terms "filler," "pigment," or "reinforcing agent" are used herein, it will be understood that such terms may be used interchangeably when referring to inorganic materials present in the rubber. Typically, the pigment content of EPDM rubber is from about 15 to about 50 percent by weight based on total weight of the rubber formulation. The pigments and reinforcing agents generally used in commercial EPDM rubber include silica fibers, amorphous silica, calcium silicate, sodium silicate, magnesium silicate, carbon black and the like.

It has been found, according to our invention, that EPDM rubber characterized by the substantial absence of calcium, e.g., calcium silicate, calcium chloride or other calcium-containing compounds, is particularly satisfactory as a gasketing material for gasketed titanium crevices used in electrolytic cells. Such EPDM rubber characterized by the substantial absence of calcium and calcium-containing compounds typically has as a pigment or reinforcing agent silica or carbon. Particularly satisfactory forms of silica include anhydrous silica from about 0.01 to about 0.1 micron in diameter, and preferably from about 0.015 to about 0.08 micron in diameter. Typically, the silica or carbon is present in an amount of from about 15 weight percent to about 50 weight percent of the total EPDM rubber, including other additives present therein.

Sufficient silica or carbon filler, pigment, or reinforcing agent should be present in the EPDM masterbatch to provide a tensile strength in excess of 3,000 pounds per square inch gauge and a Practical Shore Hardness of from about 45 to about 95.

The EPDM rubber useful in providing gaskets for titanium vessels for this invention typically contains a vulcanizing agent such as sulfur or a sulfur-bearing compound, and accelerators such as diazyls, sulfene amides, methyldialkythiocarbamates, tetraalkylthiuram disulfides. The rubber also includes accelerator activators such as zinc oxide, stearic acid, magnesia, and amines; anti-oxidants such as hydroquinonemonobenzylether, alkylated diphenylmenes, polybutylated bisphenol A, phenyl-beta-naphthyl amine, diphenyl-p-phenylene diamine, p-isopropoxy diphenylamine, aldol-alpha-naphthyl amine, di-beta-naphthyl-p-phenylene diamine, and the like; anti-ozonants such as paraphenylene diamine derivatives; and peroxy cross-linking agents.

An EPDM rubber useful in fabricating the gasket material useful in the electrolytic cells according to this invention is prepared from a masterbatch containing from about 0.5 to about 2 parts of mercaptobenzothiazide or telerium diethyl dithiocarbamate or tetramethyl thiruan disulfide, with from about 4 to about 0.5 parts of an accelerator activator such as zinc oxide, from about 1.75 to about 0.5 parts of sulfur or sulfur-bearing compound, and 50 to 70 parts anhydrous silica, based on 100 parts of the monomers.

Another particularly satisfactory EPDM rubber useful in formulating gaskets according to our invention is prepared from a masterbatch containing 100 parts of ethylene-propylene-diene copolymer, 60 parts of anhydrous silica, 5 parts of zinc oxide, 20 parts of a naphthenic oil, 1 part of NBT, 2 parts of TMTM, and 2 parts of sulfur. An ethylene-propylene-diene rubber gasket is provided where the ethylene-propylene-diene rubber is reinforced with carbon or silica and is substantially free of calcium-containing compounds, By "substantially free of calcium-containing compounds," it is meant that the EPDM rubber contains less than 0.07 weight percent calcium and preferably contains less than about 0.01 weight percent of calcium as determined by the atomic absorption; and also that the EPDM rubber contains less than about 10 percent calcium when determined by the method of emission spectroscopy of an ashed sample.

Neoprene rubber compounds, useful in providing the gaskets of this invention, typically contain the neoprene rubber, metal oxides such as red lead, zinc oxide and magnesium oxide, vulcanizates, sulfur, remnants of accelerators and retarder-activators, anti-oxidants, and pigments, reinforcing agents, and fillers.

Neoprene itself is a polymer containing the repeating units

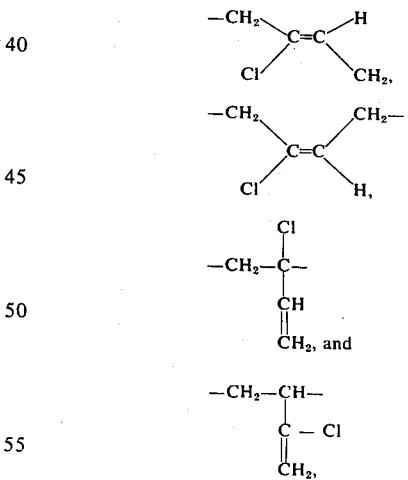

with the cis and trans 1,4 isomers, $(-CH_2)(Cl)C = CH(CH_2)$ predominating. In the neoprene rubber compounds useful in providing the rubber gaskets of this invention the neoprene polymer has a molecular weight of from about 20,000 to about 1,000,000 and most commonly from about 100,000 to about 200,000 grams per mole.

The neoprene rubber useful in providing the gaskets materials herein contemplated may contain from 15 to over 150 parts by weight, based on 100 parts of polymer, i.e., from about 12 to about 60 weight percent, of pigment, reinforcing agent, and filler. The pigments, fillers, and reinforcing agents used in commercial isoprene rubber include the various carbon blacks, clays, whitings, silicas, including silica fibers and amorphous silica, silicates including calcium silicate, sodium silicate, magnesium silicate, blanc fixe, zinc oxide, titanium dioxide, and the like.

It has been found, according to our invention, that neoprene rubber characterized by the substantial absence of calcium, e.g., calcium silicate, calcium chloride or other calcium-containing compounds, is particularly satisfactory as a gasketing material for gasketed titanium crevices used in electrolytic cells. Such neoprene rubber characterized by the substantial absence of calcium and calcium-containing compounds typically has as a pigment or reinforcing agent silica or carbon. Particularly satisfactory forms of silica include anhydrous silica from about 0.01 to about 0.1 micron in diameter, and preferably from about 0.015 to about 0.08 micron in diameter. Particularly satisfactory forms of carbon black include the SRF, GPF, HMF, FF, FEF, HAF, ISAF and EPC forms. Titanium dioxide may also be used as the pigment, reinforcing agent or filler. Typically, the reinforcing agent is present in an amount of from about 12 weight percent to about 60 weight percent of the total neoprene rubber, including other additives present therein.

Sufficient pigment, filler, or reinforcing agent should be present in the neoprene masterbatch to provide a tensile strength in excess of 3,000 pounds per square inch gauge and a Practical Shore Hardness of from about 45 to about 95.

The neoprene rubber useful in providing gaskets for titanium vessels for this invention typically contains a vulcanizing agent such as sulfur or a sulfur-bearing compound such as ethylene thiourea, and accelerators such as diazyls, sulfene amide, methyldialkythiocarbamates, tetramethylthiuram monosulfide, silicylic acid, and tetraalkylthiuram disulfides. The rubber compound also includes accelerator activators such as zinc oxide, stearic acid, magnesia, and amines; anti-oxidants such as hydroquinonemonobenzylether, alkylated diphenylmenes, polybutylated bisphenol A, phenyl-beta-naphthyl amine, diphenyl-p-phenylene diamine, p-isopropoxy diphenylamine, aldol-alpha-naphthyl amine, di-beta-naphthyl-p-phenylene diamine, and the like; anti-ozonants such as paraphenylene diamine derivatives; and peroxy cross-linking agents.

A neoprene rubber useful in fabricating the gasket material useful in the electrolytic cells according to this invention is prepared from a masterbatch containing about 2 parts of an anti-oxidant, from about 0.5 to about 2 parts of mercaptobenzothiazide or telerium diethyl dithiocarbamate or tetramethyl thiuran disulfide, with about 5 parts zinc oxide, about 4 parts magnesium oxide, and 50 to 70 parts anhydrous silica, based on 100 parts of the rubber.

Additionally, other chlorine and chloride-resistant rubber compounds, substantially free of calcium, i.e., containing less than 0.07 weight percent calcium by atomic absorption, or less than 10 weight percent calcium in the ash by emission spectroscopy, may be used in providing gaskets for titanium vessels according to this invention.

According to this invention, an electrolytic cell is provided having an anode and a cathode in a titanium and steel vessel. The vessel is divided into a titanium-bodied anolyte compartment and a steelbodied catholyte compartment. The anolyte compartment may have two or more titanium members separated by a gasket within a joint, and there are also iron or steel to titanium joints, both types of joints being subject to crevice corrosion. According to this invention, brine is fed into the anolyte compartment of an electrolytic cell. Within the anolyte compartment of the electrolytic cell, chlorine is liberated at the anode and the anolyte, under the driving force of a hydrostatic head of brine, is caused to pass through a diaphram into the catholyte compartment. The anolyte typically has a pH of from about 3.5 to about 5.6 and contains from about 250 grams per liter to about 300 grams per liter of sodium chloride. The catholyte typically contains from about 110 grams per liter to about 160 grams per liter of sodium hydroxide and from about 120 grams per liter to about 180 grams per liter of sodium chloride. The anolyte compartment and catholyte compartment are separated by an electrolyte permeable diaphram. The anolyte chamber is fabricated from a plurality of titanium members, with crevice corrosion susceptible joints between the titanium members. At various points in the cell body there are also iron or steel to titanium joints, e.g. where the anolyte chamber is joined to the catholyte chamber. The joints are gasketed by a gasket of the type herein contemplated, fabricated of a rubber material characterized by the substantial absence of calcium and calciumcontaining compounds.

While the invention has been described with reference to diaphragm cells wherein the diaphragm is electrolyte permeable and in the electrolyte, from about 25 to about 75 percent of the chlorine is electrolyzed from chloride ion to chlorine and liberated in the anolyte chamber, it should be understood that the method and apparatus of this invention are also useful in electrolytic cells wherein a permionic membrane, i.e., an ion permeable, electrolyte impermeable membrane is present between the anolyte chamber and the catholyte chamber whereby a part, or substantially all of the chloride ion is electrolyzed to elemental chlorine. Additionally, the gasketing method of this invention is useful in other chemical process apparatus fabricated from individual titanium members wherein crevice corrosion may occur. Thus, for example, the gasket and gasketing method of this invention may be used in water desalinization cells, chlorate cells, storage tanks, water electrolysis cells, heat exchangers, chemical reactors, and the like.

In order that those skilled in the art may more completely understand the present invention and the preferred methods by which the same may be carried out, the following specific example is offered:

EXAMPLE

Two ethylene-propylene-diene gaskets, one reinforced with anhydrous silica and the other reinforced with calcium carbonate, were tested as gaskets between the two titanium coupons in an autoclave containing chlorinated aqueous sodium chloride.

A test assembly was prepared for each gasket. Each test assembly was a pair of 1 inch by 2 inches by 0.060 inch RMI Grade One titanium coupons bolted together with a ¼ inch type 4 titanium bolt and separated by the gasket under test. After assembly, the coupon assembly was inserted in a Teflon-lined, steel autoclave fitted with titanium rods which served as holders for the test assembly and as electrodes.

The electrolyte for each of the tests was chlorinated aqueous sodium chloride containing 21 weight percent sodium chloride, and 0.04 weight percent sodium chlorate, and having a pH of about 2.2 to 2.9. In each test, an anodic potential of approximately 2.2 volts versus a standard silver/silver chloride electrode was applied to the test assembly. The test assembly was maintained at this voltage for 12 days at a temperature of 150°C. in the autoclave.

Run A

The first gasket tested was a 3/16 inch thick ethylene-propylene-diene gasket containing 0.01 weight percent calcium and 0.02 weight percent magnesium, determined by the method of atomic absorption spectroscopy, and having an emission spectographic analysis of greater than 10 percent aluminum and silicon, and from 1 to 10 percent each of iron, titanium, and zinc in an ashed sample. After 12 days accelerated testing, the crevice showed substantially no corrosion when visually examined.

Run B

In the second run, the gasket under test was an EPDM gasket reinforced with calcium carbonate. The gasket was a 3/16 inch thick gasket which contained 0.07 percent calcium, and 0.08 percent magnesium, determined by the method of atomic absorption spectroscopy, and an emission spectographic analysis of an ashed sample showing calcium and silicon contents of over 10 percent, a zinc content of 1 to 10 percent, and magnesium and aluminum contents of from about 0.1 to about 1 percent. After 12 days of accelerated testing as described above, approximately ¾ of the surface area of the titanium within the crevice exhibited signs of crevice corrosion upon visual examination.

It is to be understood that although the invention has been described with specific reference to particular embodiments thereof, it is not to be so limited since changes and alterations therein may be made which are within the full intended scope of this invention as defined by the appended claims.

We claim:

1. In a titanium vessel in an electrolytic system having a pair of surfaces, at least one of said surfaces being of titanium, said surfaces being separated by a gasket with a crevice therebetween subject to crevice corrosion, the improvement wherein said gasket comprises a substantially calcium free rubber composition resistant to chloride brines containing less than 0.07 weight percent calcium as determined by atomic adsorption spectroscopy and less than 10 weight percent calcium in the ash by emission spectroscopy.

2. The vessel of claim 1 wherein the rubber is chosen from the group consisting of ethylene-propylene-diene rubber, neoprene rubber, and isoprene rubber.

3. The vessel of claim 1 wherein said rubber compound comprises a filler chosen from the group consisting of carbon black, silica fibers, amorphous silica, sodium silicate, and magnesium silicate.

* * * * *